(12) United States Patent
Gould et al.

(10) Patent No.: US 7,376,718 B2
(45) Date of Patent: May 20, 2008

(54) SYSTEM AND METHOD FOR MANAGING PROVISIONING PARAMETERS IN A CABLE NETWORK

(75) Inventors: Kenneth Gould, Oakton, VA (US); Andrew Danforth, Herndon, VA (US)

(73) Assignee: Time Warner Cable, Stamford, CT (US)

( * ) Notice: Subject to any disclaimer, the term of this patent is extended or adjusted under 35 U.S.C. 154(b) by 1188 days.

(21) Appl. No.: 10/619,262

(22) Filed: Jul. 14, 2003

(65) Prior Publication Data

US 2005/0015810 A1    Jan. 20, 2005

(51) Int. Cl.
*G06F 15/177* (2006.01)

(52) U.S. Cl. .................. 709/220; 709/217; 709/248; 713/2

(58) Field of Classification Search ............... 709/220, 709/248
See application file for complete search history.

(56) References Cited

U.S. PATENT DOCUMENTS

| | | | |
|---|---|---|---|
| 5,933,631 A * | 8/1999 | Mealey et al. .......... | 713/2 |
| 6,049,826 A * | 4/2000 | Beser .................... | 709/222 |
| 6,598,057 B1 * | 7/2003 | Synnestvedt et al. ..... | 707/200 |
| 6,940,874 B2 * | 9/2005 | Ruszczyk et al. ........ | 370/516 |
| 2002/0052927 A1 * | 5/2002 | Park .................... | 709/217 |

\* cited by examiner

*Primary Examiner*—Michael Won
(74) *Attorney, Agent, or Firm*—Roberts Mardula & Wertheim, LLC

(57) ABSTRACT

A system and method for managing provisioning parameters in a cable network. A dynamic TFTP (DTFTP) server and a CMTS manage the provisioning of devices in a cable network. The DTFTP server and the CMTS share common provisioning parameters. A provisioning parameter has a name and a value. When changes are made in the value of a provisioning parameter that is also used by a CMTSs supported by that DTFTP server, the DTFTP server securely communicates the new provisioning parameter values to each such CMTS. In one embodiment of the present invention, the DTFTP server pushes the new provisioning parameter values to the CMTSs. In another embodiment of the present invention, a poller pulls the provisioning parameters from the DTFTP server to a central datastore where changes in provisioning parameters used by the CMTSs supported by the DTFTP are identified. The changed provisioning parameter values are pushed from the central datastore to the CMTSs.

16 Claims, 6 Drawing Sheets

SYSTEM AND METHOD FOR MANAGING PROVISIONING PARAMETERS IN A CABLE NETWORK

FIELD OF INVENTION

The present invention relates in general to configuration of network devices. More specifically, present invention relates to the configuration and synchronization of provisioning files for configuration of devices in a cable network.

BACKGROUND OF THE INVENTION

The modern cable network has evolved a long way from its humble beginnings. In 1948, the first community antenna system delivered television signals over twin-lead strung from house to house. In 1950, a coax system was built in which the coax cable was strung on utility poles. These systems were intended to solve reception problems caused by weak signals (rural areas) or by ghosting from multiple reflected signals (urban areas). In the seventies, communications satellites breathed new life into the cable industry by providing access to programming not otherwise available in the cable operator's service area.

Until recently, the cable network was still predominantly a vehicle for delivering entertainment. With the advent of the Internet and the rise in demand for broadband two-way access, the cable industry began to seek ways of utilizing its existing plant. Pure coax cable networks were replaced with hybrid fiber networks (HFNs) using optical fiber from the headend to the demarcation with the subscriber coax (usually at a fiber node).

A major problem for a cable operator desiring to provide digital service was the configuration of its network. Designed for one-way delivery of broadcast signals, the existing cable network topology was optimized for downstream (toward the subscriber) only service. New equipment would have to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS), was released in 1998. DOCSIS establishes standards for cable modems and supporting equipment.

A DOCSIS compliant modem (DCCM) must be "provisioned" before the DCCM may be operated on the network. Provisioning involves a process by which a network device is initialized, authenticated, registered, and configured to operate with a cable network. A network device receives a boot file as part of the provisioning process.

Figure 1:
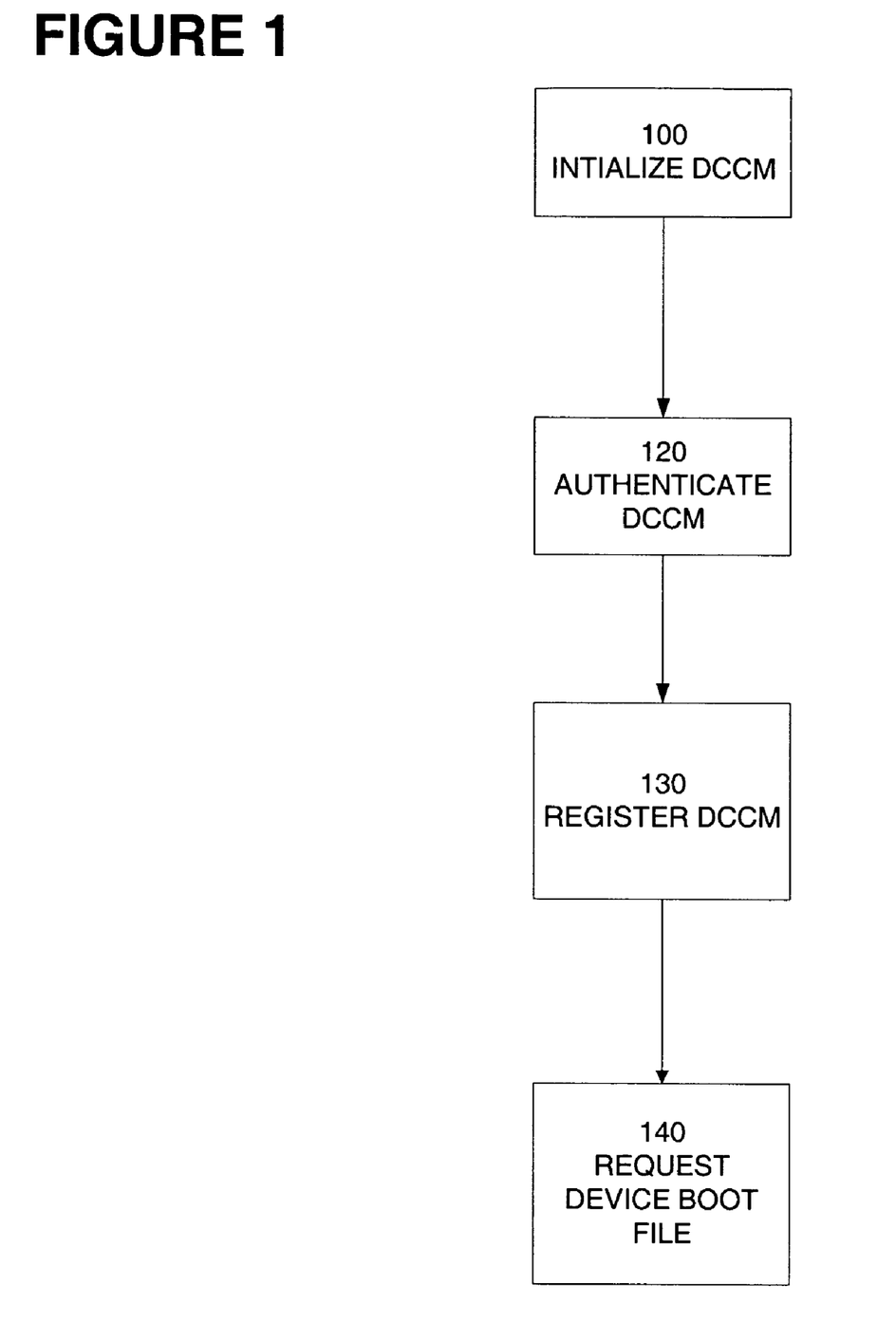
FIG. 1 illustrates the provisioning of a DOCSIS-compliant cable modem.

Referring to FIG. 1, the provisioning of a DOCSIS-compliant cable modem (DCCM) with a boot file is illustrated. Each time a DCCM is powered-on or reset, it must be initialized 100 through a series of "handshakes" and transfers of data between itself and a cable modem termination system (CMTS) at the cable headend. During this process, the DCCM receives channel and sync information to allow it to establish communications with the CMTS. It also receives a temporary service identification (SID) number. The modem power is set and the CMTS and the DCCM are now "known" to each other and able to communicate.

Following initialization, the DCCM is then authenticated 120 to confirm that the DCCM is entitled to receive service. The next provisioning step is registration 130, where the DCCM is configured as an Internet device. During this process, the DCCM synchronizes its clock with that of the CMTS and obtains an Internet protocol (IP) address from a Dynamic Host Configuration Protocol (DHCP) server. The DHCP server also provides the DCCM the network address of a Trivial File Transfer Protocol (TFTP) server and where a device configuration file (or "boot file") for that modem can be found and downloaded. The DCCM requests its device boot file 140 by the sending the TFTP a request message comprising a device boot file filename. Upon receipt of the device boot file, the DCCM sends a registration request (REG-REQ) to the CMTS. This REG-REQ includes the current service identification (SID), IP address, operational attributes, upstream and downstream channel IDs, time stamps, and other configuration settings, as well as a message integrity check (MIC) value (described below). If the information is accepted, the CMTS responds with a new SID and completes the registration process.

In general, then, the CMTS is not configured with the attributes of its DCCMs. Rather, the CMTS will acquire these attributes and the attribute values through the registration request message.

In a DOCSIS environment, the device boot file comprises device attributes that are expressed in type-length-value (TLV) format and information necessary for the DCCM to operate on the cable network to which it is connected. By way of illustration, attributes identified by the DOCSIS standard for a DCCM include the maximum upstream and downstream data rates (based on the service level to which the customer has subscribed), the number of devices supported by the DCCM that require IP addresses, and information necessary to identify and authenticate the DCCM to the cable network. The device boot file is received by the DCCM in binary format. The DCCM uses the device boot file to populate device attributes with specific values.

As previously noted, the boot file provided by the TFTP server to the DCCM includes a message integrity check (MIC) value. The MIC is an MD-5 hash of certain device attributes plus a shared secret. The CMTS uses the same shared secret used by the TFTP server and the device attributes in the REG-REQ message it receives from the DCCM to compute the MIC value. The CMTS then compares the MIC value it computed to the MIC value computed by the TFTP server and included in the REG-REQ message sent by the DCCM. If the MIC values match, the registration request is granted. If the MIC values do not match, the registration request is denied.

In order for the MIC process to be effective, the TFTP server and the CMTS must use the same shared secret. Changing the shared secret is not a simple task. Currently, updating the shared secret in the CMTS is a manual process fraught with possibilities for human error. An operator typically manually logs into each of the CMTSs one after another to update the shared secret value. Most CMTSs in use today CMTSs permit up to two shared secrets to be stored at one time. If the CMTSs used by an MSO permit only one shared secret to be stored, the shared secret is first removed from the CMTS. The CMTS will then ignore the MIC and continue to register CMs, albeit without the security offered by the shared secret and the MIC. The old shared secret on the DCS is replaced with a new shared secret. Finally, the new shared secret is added to each CMTS supported by the DCS.

If the CMTSs used by the system operator allows two shared secrets to be stored, the new shared secret will be stored on the CMTS leaving the original shared secret value in place. Once all of the CMTSs are configured with both the old and new shared secret value, the boot file server configuration is changed so that the new shared secret value is used. Then the old shared secret value is removed from each CMTS supported by the DCS. Due to the manual nature of the process, mistakes are unavoidable, resulting in service problems, inefficient use of engineering time, and a bias against modification of provisioning parameters. Further, until all of the CMTSs have been updated with the new shared secret, some registration requests will be accepted using an old, and possibly compromised, shared secret.

Under the DOCSIS standards, the traffic that a DCCM may send and receive may be regulated at the DCCM by filters set to either "pass" or to "do not pass" traffic based on IP address (source or destination), port (source or destination), protocol, or packet type (multicast or unicast). The filter group that is enforced at a DCCM is determined by bootfile attributes that can be set in the static file. Use of filters at the DCCM offers the system operator a reasonable level of protection from intentional and unintentional behavior of its subscribers. Port filters, for example, protect the network from a rogue DCHP server established on a subscriber's customer premises equipment (CPE) by permitting only DHCP client transactions through the DCCM. DHCP client activity requires the DCCM to permit inbound (to the CPE) packets destined to port 68 on the DHCP client (located on the CPE) and outbound packets destined to port 67 on the DHCP server. The DHCP filter blocks all other combinations of ports 67 and 68 to prohibit subscribers from running their own DHCP server in competition with the DHCP server of the system operator. Blocking these other combinations permits a subscriber to run a DHCP server on its CPE without interfering with the operation of the network.

Similarly, access to other DCCMs on the network can be prevented by setting the IP filter to block access to the IP addresses that are not routable. As most DCCMs are provisioned with non-routable IP addresses (e.g., in the form 10.x.x.x), setting a filter to preclude access to these addresses can provide a measure of security against one subscriber "snooping" another subscriber's DCCM.

However, depending on filters at the DCCM for security is not risk free. The DCCM is not under control of the network operator and a determined subscriber may defeat the filter settings with serious results. Additionally, the development of CPU controlled cable modems (CCCMs) increases the vulnerability of the filter configuration to tampering. For this reason, the more desirable location for filter enforcement is the CMTS. In this implementation, filter settings are established at the CMTS and arranged by type and by groups within filter types. The DOCSIS boot file attributes relating to filter groups may include four indices:

one identifying the upstream filter group for packets originating from the cable modem (i.e., those packets whose source MAC address matches that of the cable modem).

one identifying the upstream filter group for packets originating from subscribers attached to the cable modem (i.e., those packets whose source MAC address does not match that of the cable modem).

one identifying the downstream filter group for packets destined to the cable modem (i.e., those packets whose destination MAC address matches that of the cable modem).

one identifying the downstream filter group for packets destined to subscribers attached to the cable modem (i.e., those packets whose destination MAC address does not match that of the cable modem).

A subscriber is assigned to a filter group based on policies established by the network operator and by requirements established by the Internet service provider (ISP) that services a subscriber. As in the case of the shared secret, once a filter group is defined, changing the filter group definition is a difficult and risky operation.

Typically, DOCSIS device boot files are pre-generated and stored in a file library on a server as static files. Thus, a device boot file is created for each possible configuration of a network device. The permutations of the various service levels coupled with other subscriber-specific elements makes management of this library a significant task. Additionally, large networks must maintain multiple file library servers, requiring that all servers be updated with changes to the file library. In order to establish a new configuration for a device, even for a single customer, a new device boot file must be added to the file library and populated to all of the boot file library servers.

Service providers are increasingly moving toward dynamically generating boot files based upon the content of the device boot file request message. (A dynamic TFTP (DTFTP) server meeting the requirements of the present invention is described in commonly owned U.S. Pat. No. 7,293,078, entitled "System And Method For Provisioning A Provisionable Network Device With A Dynamically Generated Boot File Using A Server" and filed Jul. 14, 2003, which application is incorporated herein in its entirety and for all purposes.) For example, a DTFTP server may parse the file name of the device boot file in the device boot file message to determine what configuration attributes are required in the device boot file and what values are to be assigned to those attributes.

While the introduction of DTFTP servers for boot file generation greatly improves the ability of service providers to manage boot file generation, use of DTFTP servers alone does not solve problems of managing changes in provisioning parameters that affect the boot file generation server and the CMTS. What is needed is a system and method for updating and synchronizing changes in provisioning parameters used by DTFTP by servers and CMTSs that does not require manual intervention.

SUMMARY OF THE INVENTION

An embodiment of the present invention is a system and method for updating and synchronizing changes made to provisioning parameters used by a DTFTP server and the CMTSs supported by that DTFTP server without manual intervention. When changes are made in the value of provisioning parameters on the DTFTP server that are required to be reflected by the CMTSs supported by that DTFTP server, the DTFTP server securely communicates the new provisioning parameter values to each such CMTS.

It is therefore an aspect of the present invention to synchronize provisioning parameters used by DTFTP servers and CMTSs.

It is yet another aspect of the present invention to eliminate human error associated with updating provisioning parameters used by DTFTP servers and CMTSs.

It is still another aspect of the present invention to significantly reduce the time required to update provisioning parameters used by DTFTP servers and CMTSs.

It is further aspect of the present invention to improve security of the registration process in an HFN by updating a shared secret efficiently and often.

It is an aspect of the present invention to improve the security of an HFN by permitting the implementation of CMTS filter groups.

It is another aspect of the present invention to permit an operator of an HFN to utilize provisioning parameters that require coordination between a DTFTP server and a CMTS.

These and other aspects of the present invention will become apparent from a review of the general and detailed descriptions that follow.

An embodiment of the present invention is a system and method for updating and synchronizing changes in provisioning parameters used by a DTFTP server and the CMTSs supported by that DTFTP server. When changes are made in the value of a provisioning parameter on the DTFTP server that is also used by a CMTSs supported by that DTFTP server, the DTFTP server securely communicates the new provisioning parameter values to each such CMTS. The communication between the DTFTP server and the CMTS is performed through simple network management protocol (SNMP) commands. However, this is not a limitation. In an alternate embodiment, the between the DTFTP server and the CMTS is performed through proprietary command-line scripts. The DTFTP server is adapted to determine which provisioning parameter values require synchronization between the DTFTP server and its supported CMTSs.

In another embodiment of the present invention, a poller that resides on the DTFTP server manages the synchronization function between that DTFTP server and its supported CMTSs. The poller monitors the configuration of the DTFTP server and reports a current state of provisioning parameter values to a central datastore. The central datastore determines if the reported current state of provisioning parameter values differs from the previous "current" state. If changes have been made to the provisioning parameter values, the central datastore determines whether any of the changes are required by the CMTSs supported by the DTFTP server. If the changes are required by the CMTS supported by the DTFTP, the changes are passed on to the CMTSs by the central datastore.

The central datastore holds the current configuration of all DTFTP servers. In addition to receiving changes made to the provisioning parameter values made at a DTFTP server, the central datastore can invoke a change in a provisioning parameter value across all DTFTP servers in the HFN and the CMTSs supported by those DTFTP servers. In this embodiment, a change in a provisioning parameter value is broadcast to all of the DTFTPs within an HFN. The changed is then reported back to the central datastore during the monitoring process. The central datastore then propagates the changes to all the CMTSs within the HFN.

In still another embodiment, a CMTS is enabled to enforce filter setting for modems supported by that CMTS. The CMTS manages a filter group table. A subscriber subject to the CMTS filters received filter group attribute values in the boot file provide to the subscriber by the DTFTP server. The group values of a particular subscriber are acquired by the CMTS during the registration process when the subscriber's DCCM provides the CMTS with the boot file received from the DTFTP server.

The means by which the filter group table at the CMTS is created and managed is not specified by the DOCSIS standard. In an embodiment of the present invention, the filter group table is managed at the DTFTP server. Changes to the filter group table at the DTFTP server are securely communicated to each CMTS supported by the DTFTP server. In one embodiment of the present invention, the filter group table controls a standalone DCCM. In another embodiment of the present invention, the filter group table controls a CPE controlled cable modem (CCCM).

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

The description of the present invention that follows utilizes a number of terms and phrases the definitions of which are provided below for the sake of clarity and comprehension:

| | |
|---|---|
| Attribute | A configurable parameter of a network device having a name (or type) and a value conveyed in a boot file. The attribute value determines some aspect of the operation of the provisionable network device on the network to which it is connected. |
| Boot File | A binary file comprising attributes and attribute values for cable modems, such as Maximum Downstream and Upstream Rates, Burst Rate, Class of Service or Baseline Privacy, SNMP MIBs and other parameters. |
| Provisioning Parameter | A parameter having a name (or type) and a value used by a network provisioning system that determines some aspect of the provisioning of a device for use on that network. Provisioning parameters include, but are not limited to, attributes. |
| DOCSIS: | Data Over Cable System Interface Standard |
| IP | Internet Protocol |
| MAC | Media Access Control (layer 2 unique address for devices) |
| MIC | A "message integrity check" the value of which is a hash of attributes (type and value) plus a shared key or "secret." |
| SNMP | Simple Network Management Protocol |
| TFTP | Trivial File Transfer Protocol (IP file transfer mechanism) |
| TLV | Type - Length - Value encoding structure. |
| HFN | Hybrid fiber network. Current cable networks typically communicate from the head end to the fiber node over optical fiber links. From the fiber node to a subscriber, communications is typically carried over coax cable (copper). |
| SNMP | Simple Network Management Protocol |
| TFTP | Trivial File Transfer Protocol (IP file transfer mechanism) |
| CPE | Customer Premises Equipment. CPE is equipment at the subscriber's premises that is behind and connected to the DCCM. |

An embodiment of the present invention is a system and method for updating and synchronizing changes in provisioning parameters used by a DTFTP server and the CMTSs supported by that DTFTP server.

Figure 2:
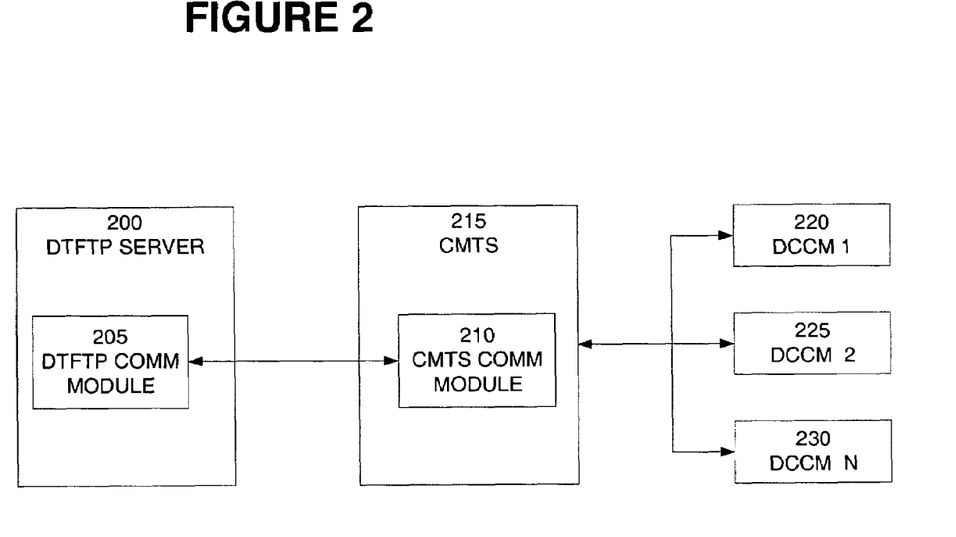
FIG. 2 illustrates a block diagram of the architecture of a synchronization system according to an embodiment of the present invention.

FIG. 2 illustrates a block diagram of a synchronization system according to an embodiment of the present invention. A DTFTP server 200 comprises a DTFTP communication module 205. The DTFTP communication module 205 communicates with CMTS 215 through CMTS communication module 210. CMTS services DCCM 1-N (220, 225, and 230 respectfully). The DTFTP communication module 205 and the CMTS communication module 210 communicate through SNMP messages exchanged through packet data unit (PDU) messages. However, this is not meant as a limitation. As will be apparent to those skilled in the art, other communication protocols may be use without departing from the scope of the present invention. For example, the CMTS updates can be performed via a script using proprietary command-line commands.

Changes made to the value of a provisioning parameter that is used by the DTFTP server and the CMTS are automatically sent from the DTFTP server to the CMTS. The CMTS is then updated so that the DTFTP server and CMTS reflect the same value for the provisioning parameter.

Figure 3:
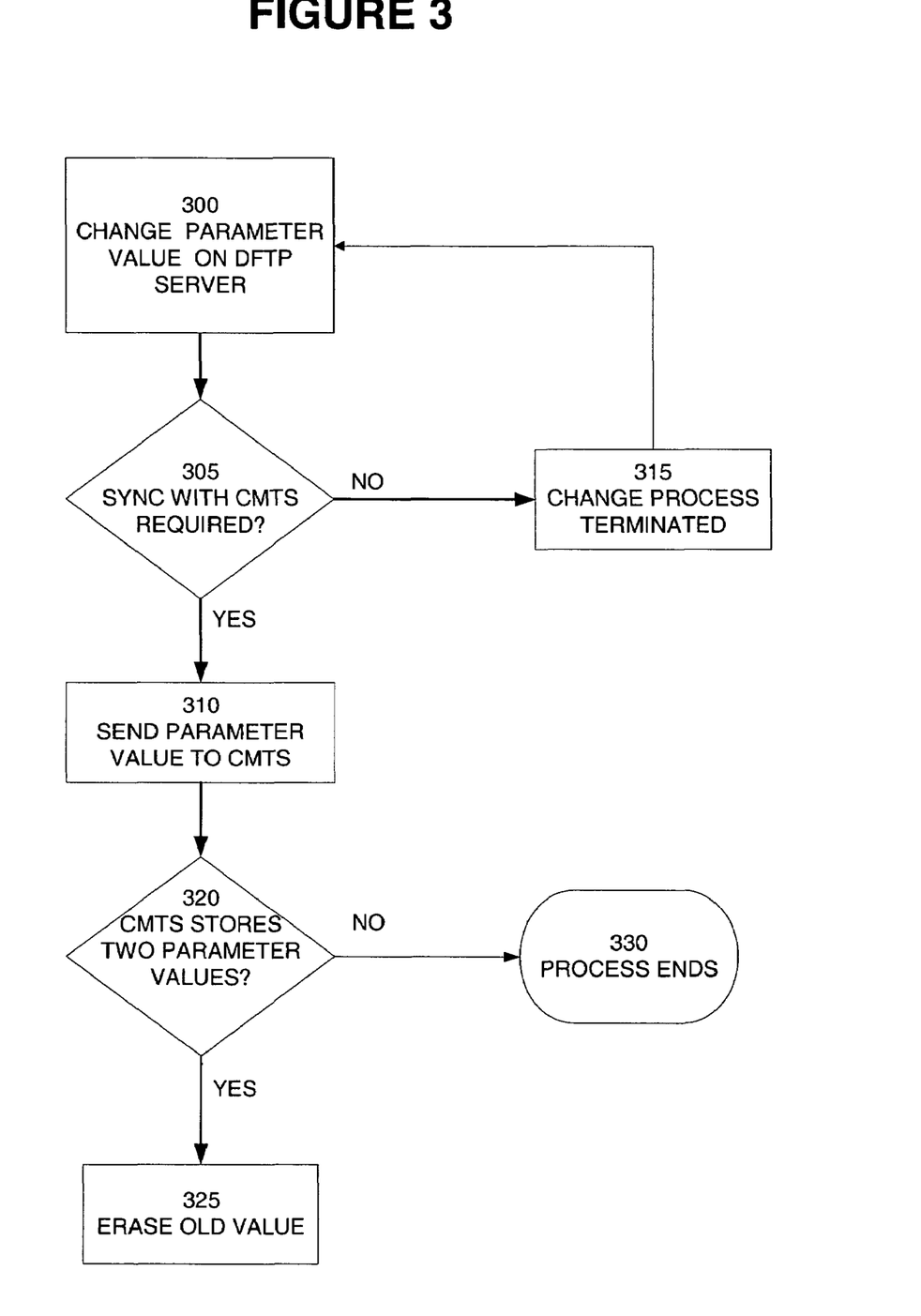
FIG. 3 illustrates a general flow of a method of updating and synchronizing changes to provisioning parameters used by a DTFTP server and one or more CMTSs supported by that DTFTP server according to an embodiment of the present invention.

FIG. 3 illustrates general flow of a method of updating and synchronizing changes to provisioning parameters used by a DTFTP server and one or more CMTSs supported by that DTFTP server according to an embodiment of the present invention. A change is made to the value of a provisioning parameter stored on a DTFTP server 300 and a determination is made whether this value is used by the DTFTP server and the CMTSs supported by the DTFTP server 310. If the provisioning parameter value affected by the change is not commonly held, the change process is terminated 315. If the provisioning parameter value affected by the change is commonly held, the provisioning parameter value affected by the change is conveyed to each CMTS 310 supported by the DTFTP server. As previously described, some CMTSs are designed to store two values for some provisioning parameters. If the CMTS is capable of storing two values 320, after the new value of the provisioning parameter value is sent, an instruction is issued to the CMTS to erase the old provisioning parameter value 325. If the CMTS is not capable of storing two values, the process ends 330.

In an exemplary embodiment, a DTFTP server and one or more CMTSs supported by that DTFTP server use a shared secret (or shared key) to compute a media integrity check (MIC) value for a boot file. The MIC value is the result of an MD-5 hash computed over the contents of the boot file and the shared secret. In this exemplary embodiment, the value of the shared secret is changed at the DTFTP server. Because the shared secret is needed by the CMTSs supported by the DTFTP server, the new value of the shared secret is sent to those CMTSs via an SNMP message. If a CMTS supports storing two shared secrets, the new shared secret is stored at the CMTS but is not "active" in that the current shared secret is still used to generate the MIC value. Following delivery of the new shared secret to all CMTSs supported by the DTFTP server, the DTFTP server sends a second message instructing each CMTS to delete the current shared secret and to activate the "new" shared secret. The result of this process is to synchronize the shared secret used by the DTFTP server and each of the CMTSs supported by the DTFTP server.

In yet another exemplary embodiment, a CMTS is configured to manage filter groups for the DCCMs supported by that CMTS. The filter groups to which a particular DCCM is assigned are determined by filter group attribute values specified in the DCCM device boot file created by the DTFTP server that supports the CMTS. The DCCM boot file is conveyed to the CMTS in the REG-REQ message sent by the DCCM to the CMTS to complete the registration of the DCCM with the cable network. In order for the CMTS to properly set the filters for a specific DCCM, the CMTS must associate the filter group attribute values in the boot file in the same way as the DTFTP server.

In this exemplary embodiment, the DTFTP server and the CMTSs supported by that DTFTP server maintain synchronized filter group definitions (or tables) that associate the filter group attribute values to specific filter settings. The filter group definition is changed at the DTFTP server. Because the filter group definition is needed by the CMTSs supported by the DTFTP server, the new the filter group definition is sent to those CMTSs via an SNMP message. The result of this process is to synchronize the filter group definition used by the DTFTP server and each of the CMTSs supported by the DTFTP server. If desired, the CMTS can cause each DCCM to reboot, thereby updating the filter group attribute values of the DCCM.

Figure 4:
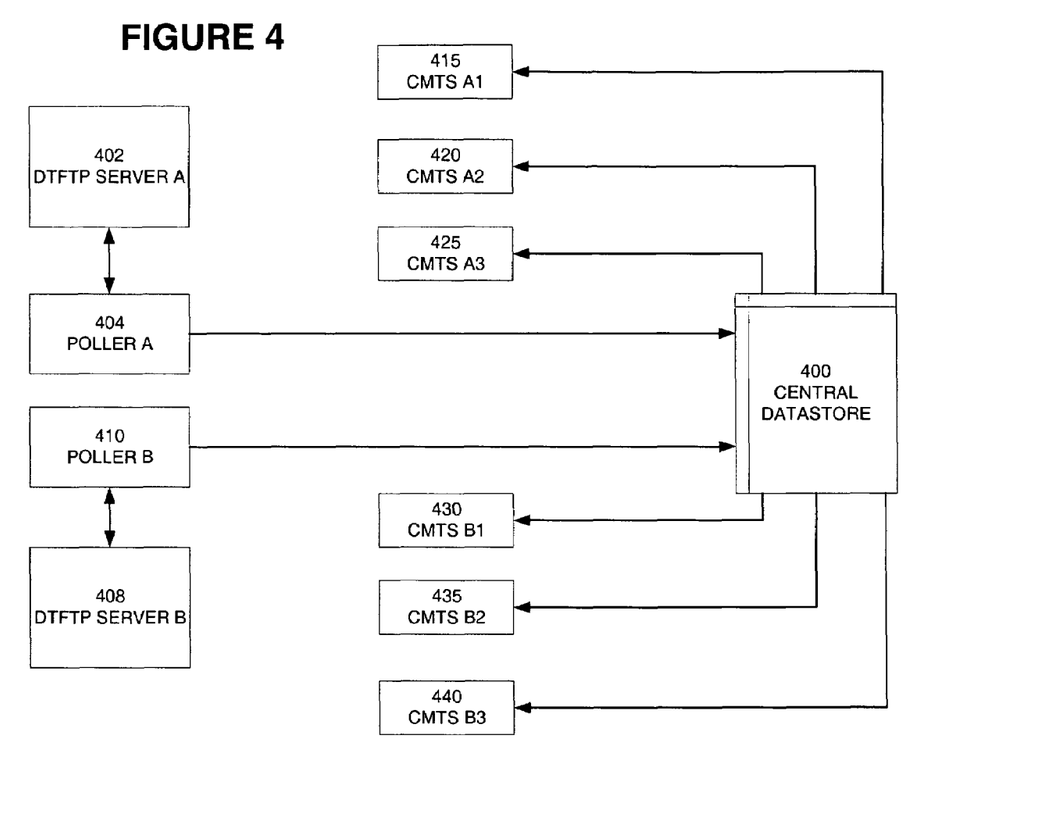
FIG. 4 illustrates a block diagram of a system for updating and synchronizing changes in provisioning parameters using a poller according to an embodiment of the present invention.

Still another embodiment of the present invention uses a poller to manage changes to provisioning parameter values across all DTFTP servers and CMTSs in a network. FIG. 4 illustrates a block diagram of a system for updating and synchronizing changes in provisioning parameters using a poller according to an embodiment of the present invention.

A DTFTP server A 402 is monitored by poller A 404. The DTFTP server A controls CMTS A1 415, CMTS A2 420, and CMTS A3 425. DTFTP Server B 410 is monitored by poller B 408. The DTFTP server B controls CMTS B1 430, CMTS B2 435, and CMTS B3 440. Poller A 404 polls DTFTP server A 402 and reports a current set of provisioning parameters and their associated values to a central datastore 400. Poller B 410 polls DTFTP server B 408 and reports a current set of provisioning parameter values to the central datastore 400. The central datastore 400 also communicates with the CMTSs supported by DTFTP server A 402 (415, 420, and 425) and the CMTSs supported by DTFTP server B 408 (430, 435, and 440).

Figure 5:
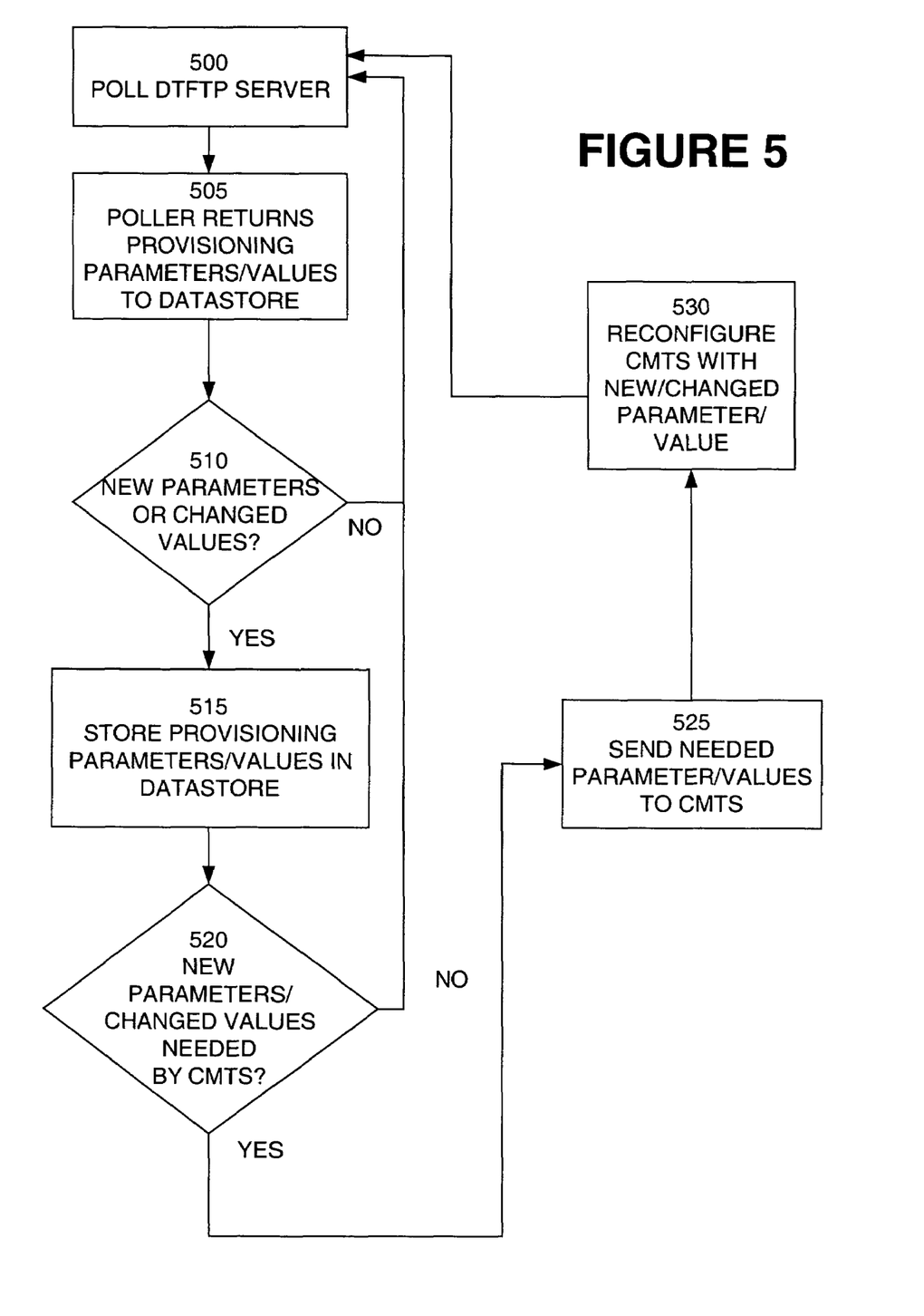
FIG. 5 illustrates a process of synchronizing a DTFTP server and one or more CMTSs supported by that DTFTP server according to an embodiment of the present invention.

Additionally, the central datastore 400 manages the synchronization of provisioning parameter values between a DTFTP server and the CMTSs supported by that DTFTP server. Referring to FIG. 5, a process of synchronizing a DTFTP server and one or more CMTSs supported by that DTFTP server according to an embodiment of the present invention is illustrated. The DTFTP is polled 500. The poller returns provisioning parameters and data to a datastore 505. The datastore determines whether the "current" set of provisioning parameters and/or provisioning parameter values reported by the poller differ from the set of provisioning parameter values stored in central datastore 510. If the current set of provisioning parameters and provisioning parameters values stored in the datastore is the same as the set returned by the poller, the process resumes with polling the DTFTP server 500. If changes have been made, the polled set of provisioning parameters and provisioning parameter values is stored in the central datastore 515. The central datastore determines whether any of the changes in provisioning parameters and/or the provisioning parameter values are needed by one or more CMTSs supported by the polled DTFTP server 520. If the changes are needed by one or more CMTSs supported by the polled DTFTP server, the changes are passed on to the appropriate CMTSs by the central datastore 525 and those CMTSs are reconfigured 530. If the changes are needed by a CMTS supported by the polled DTFTP server, the process resumes with polling the DTFTP server 500.

In another exemplary embodiment, a DTFTP server and one or more CMTSs supported by that DTFTP server use a shared secret to compute a media integrity check (MIC) value for a boot file. In this exemplary embodiment, the value of the shared secret is changed at the DTFTP server. The current provisioning parameters (including the new shared secret value) are reported by a poller to a central datastore. Because a provisioning parameter value has changed, the polled set of provisioning parameter values is stored at the central datastore. The central datasore determines that the new shared secret value is needed by the CMTSs supported by the DTFTP server and sends the new shared secret value to those CMTSs via an SNMP message. If a CMTS supports storing two shared secrets, the new shared secret is stored at the CMTS but is not "active" in that the current shared secret is still used to generate the MIC value. Following delivery of the new shared secret to all CMTSs supported by the DTFTP server, the central datastore sends a second message instructing each CMTS to delete the current shared secret and to activate the "new" shared secret. The result of this process is to synchronize the shared secret used by the DTFTP server and each of the CMTSs supported by the DTFTP server.

Figure 6:
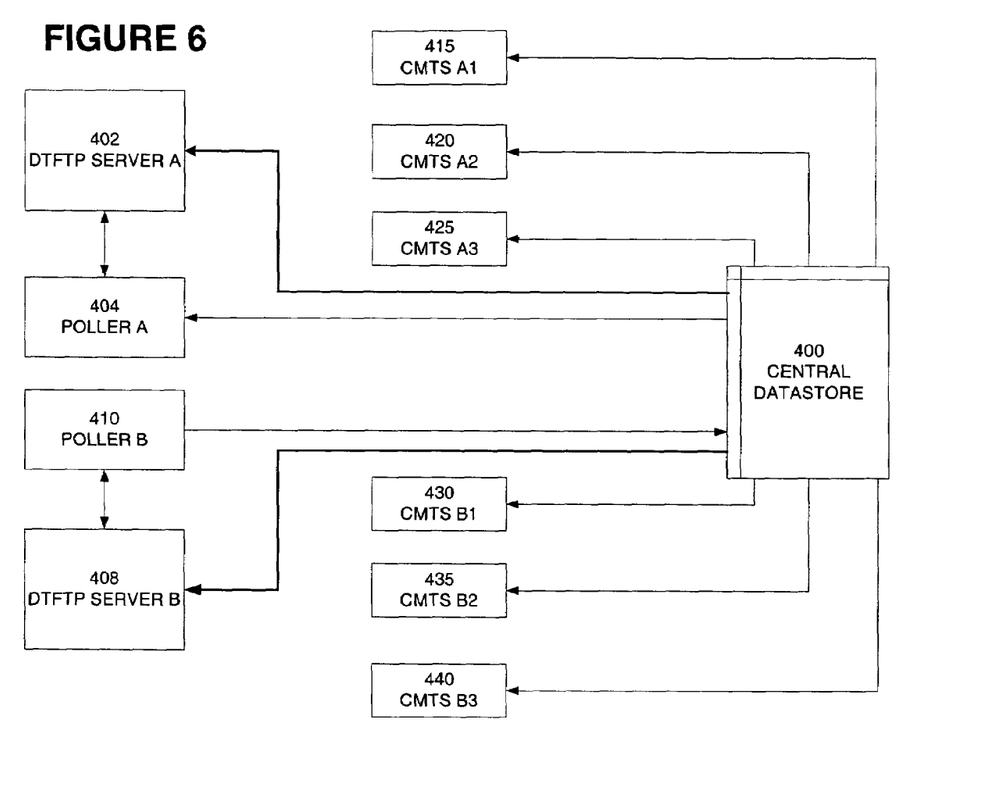
FIG. 6 a block diagram of a system for updating and synchronizing changes in provisioning parameters using a poller and a central datastore in communication with DTFTP servers according to an embodiment of the present invention.

In still another embodiment, a central datastore holds the current configuration of all DTFTP servers. Referring to FIG. 6, in addition to receiving changes made to the provisioning parameter values by a DTFTP server, the central datastore 400 is linked to DTFTP server A 402 and to DTFTP server B 410. Through this link, the central datastore 400 can invoke a global change in a provisioning parameter value across DTFTP server A 402 and DTFTP server B 410 and the CMTSs supported by those DTFTP servers. In this embodiment, a global change is broadcast to all of the DTFTPs within an HFN. The change is then reported back to the central datastore 400 during the polling process. The central datastore 400 then propagates the changes to all the CMTSs within the HFN.

A system and method for synchronizing provisioning parameters used by a DTFTP server and the CMTSs supported by that DTFTP server has been described. It will be understood by those skilled in the art of the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

We claim:

1. A system for managing provisioning parameters in a cable network, the system comprising:
   a communication link;
   a DTFTP server, wherein the DTFTP server utilizes a first set of provisioning parameters;
   a CMTS supported by the DTFTP server, wherein the CMTS uses a second set of provisioning parameters and wherein the first set of provisioning parameters and the second set of provisioning parameters share one or more common provisioning parameters; and
   wherein the DTFTP server is adapted to:
      receive a change to the first set of provisioning parameters;
      make a determination as to whether the change is to one of the one or more common provisioning parameters;
      in the event that the change is to one of the one of the one or more common provisioning parameters, send the changed common provisioning parameter to the CMTS via the communication link, wherein the second set of provisioning parameters is updated with the changed common provisioning parameter.

2. The system of claim 1, wherein the communication link is an IP network.

3. The system of claim 1, wherein the common provisioning parameter is a shared secret.

4. The system of claim 1, wherein the common provisioning parameter is a filter table pointer.

5. A method for managing provisioning parameters in a cable network, wherein the network comprises a DTFTP server utilizing a first set of provisioning parameters and a CMTS supported by the DTFTP server and utilizing a second set of provisioning parameters, and wherein the first set of provisioning parameters and the second set of provisioning parameters share one or more common provisioning parameters, the method comprising:
   receiving a change to the first set of provisioning parameters;
   making a determination as to whether the change is to one of the one or more common provisioning parameters;
   in the event that the change is to one of the one or more common provisioning parameters, sending the changed common provisioning parameter to the CMTS via a communication link, wherein the second set of provisioning parameters is updated with the changed common provisioning parameter.

6. The method for managing provisioning parameters in a cable network of claim 5, wherein the communication link is an IP network.

7. The method for managing provisioning parameters in a cable network of claim 5, wherein the common provisioning parameter is a shared secret.

8. The method for managing provisioning parameters in a cable network of claim 5, wherein the common provisioning parameter is a filter table pointer.

9. A system for managing provisioning parameters in a cable network, the system comprising a communication link, a poller, a DTFTP server, a central datastore, and a CMTS supported by the DTFTP server, wherein:
   the DTFTP server utilizes a first set of provisioning parameters;
   the CMTS uses a second set of provisioning parameters and wherein the first set of provisioning parameters and the second set of provisioning parameters share one or more common provisioning parameters;
   the poller is adapted to obtain the first set of provisioning parameters from the DTFTP server; and
   the central datastore is adapted to:
      receive the first set of provisioning parameters from the poller;
      make a first determination whether the first set of provisioning parameters differ from a last previous first set of provisioning parameters located at the central datastore;
      in the event the first set of provisioning parameters differ from a last previous first set of provisioning parameters located at the central datastore, make a second determination whether a change has occurred in one of the one or more common provisioning parameters; and
      in the event that the change is to one of the one or more common provisioning parameters, send the changed common provisioning parameter to the CMTS via the communication link wherein the second set of provisioning parameters is updated with the changed common provisioning parameter.

10. The system of claim 9, wherein the communication link is an IP network.

11. The system of claim 9, wherein the common provisioning parameter is a shared secret.

12. The system of claim 9, wherein the common provisioning parameter is a filter table pointer.

13. A method for managing provisioning parameters in a cable network, wherein the network comprises a poller, a central datastore, a DTFTP server utilizing a first set of provisioning parameters and a CMTS supported by the DTFTP server and utilizing a second set of provisioning parameters, and wherein the first set of provisioning parameters and the second set of provisioning parameters share one or more common provisioning parameters, the method comprising:

at the poller, obtaining the first set of provisioning parameters from the DTFTP server; at the central datastore:
receiving the first set of provisioning parameters from the poller;
making a first determination whether the first set of provisioning parameters differ from a last previous first set of provisioning parameters located at the central datastore;
in the event the first set of provisioning parameters differ from a last previous first set of provisioning parameters located at the central datastore, making a second determination whether a change has occurred in one of the one or more common provisioning parameters; and
in the event that the change is to one of the one or more common provisioning parameters, sending the changed common provisioning parameter to the CMTS via the communication link wherein the second set of provisioning parameters is updated with the changed common provisioning parameter.

14. The method for managing provisioning parameters in a cable network of claim 13, wherein the communication link is an IP network.

15. The method for managing provisioning parameters in a cable network of claim 13, wherein the common provisioning parameter is a shared secret.

16. The method for managing provisioning parameters in a cable network of claim 13, wherein the common provisioning parameter is a filter table pointer.

* * * * *